United States Patent
Guthrie

(10) Patent No.: US 12,491,409 B1
(45) Date of Patent: Dec. 9, 2025

(54) SAFETY ANCHOR

(71) Applicant: SPORT BOLTING LLC, Austin, TX (US)

(72) Inventor: Karl Guthrie, Austin, TX (US)

(*) Notice: Subject to any disclaimer, the term of this patent is extended or adjusted under 35 U.S.C. 154(b) by 0 days.

(21) Appl. No.: 18/824,225

(22) Filed: Sep. 4, 2024

(51) Int. Cl.
*A63B 29/02* (2006.01)

(52) U.S. Cl.
CPC .................. *A63B 29/024* (2013.01)

(58) Field of Classification Search
CPC ..... A63B 29/024; F16B 13/065; F16B 13/066
USPC ............................................................ 411/55
See application file for complete search history.

(56) References Cited

U.S. PATENT DOCUMENTS

| | | | | |
|---|---|---|---|---|
| 612,316 | A * | 10/1898 | Downes | F16B 13/065 84/176 |
| 2,850,937 | A * | 9/1958 | Ralston | E21D 21/02 405/259.1 |
| 3,329,058 | A * | 7/1967 | Deans | E21D 21/02 116/200 |
| 4,233,881 | A * | 11/1980 | Carrier | F16B 13/12 411/72 |
| 5,263,803 | A * | 11/1993 | Anquetin | F16B 13/00 411/65 |
| 6,068,226 | A * | 5/2000 | Anders | A63B 29/025 248/231.91 |
| 7,347,403 | B2 * | 3/2008 | Belcourt | A63B 29/027 248/231.9 |
| 8,894,329 | B1 * | 11/2014 | Kekahuna | E04B 1/4157 405/259.4 |
| 2015/0053839 | A1 * | 2/2015 | Hubert | F16B 13/00 248/507 |
| 2016/0252121 | A1 * | 9/2016 | Gstach | F16B 43/00 411/55 |
| 2020/0289898 | A1 * | 9/2020 | Wagner | A63B 29/024 |

FOREIGN PATENT DOCUMENTS

| | | | |
|---|---|---|---|
| DE | 202020003468 U1 | * | 3/2021 |
| KR | 101544516 B1 | * | 8/2015 |

* cited by examiner

*Primary Examiner* — Kimberly T Wood
(74) *Attorney, Agent, or Firm* — Garth Janke, LLC

(57) ABSTRACT

A safety anchor for installing in a hole drilled into a structure, the anchor having a hanger member, a threaded member, and a hollow sleeve member, the sleeve member having a lip portion adapted to stand outside the drilled hole to facilitate grasping the sleeve portion and removing it from the hole after the anchor has been installed in the drilled hole, and the hanger member having a recess adapted to provide a volume of relief above the surface of the structure for receiving the lip member.

6 Claims, 5 Drawing Sheets

SAFETY ANCHOR

FIELD OF THE INVENTION

The present invention relates to a safety anchor, which is installed in a hole that has been drilled into a rock face and used by rock climbers as an anchor point. More particularly, the invention relates to a low cost safety anchor that can be easily and fully withdrawn from the hole for replacement using the existing hole, and thereby avoiding the need for drilling a new hole.

BACKGROUND

In the sport of rock climbing, safety anchors are based on studs, sleeves, or glue-in anchors that have been installed into holes that were drilled into the rock, typically either by climbers who first scale the rock to develop a climbing route, known as first ascensionists, or subsequent climbers who replace anchoring hardware on existing climbing routes, performing what is known as route maintenance. Commonly, concrete wedge anchors sold in hardware stores like Home Depot® for general construction are used in rock climbing as well.

A typical low cost concrete wedge anchor 1 is shown in FIG. 1, marketed under the registered trademark TRUBOLT® by Illinois Tool Works Inc. of Glenview Illinois. The wedge anchor 1 has a threaded stud 2 that terminates in an integral cone-shaped wedge 3 at one end of the stud, a nut 4 for threading onto the stud at an opposite end of the stud, a washer 5, and an "expansion clip" 6 coaxially disposed about the stud in the vicinity of the wedge. The anchor 1 is installed in a drilled hole 7 in a rock formation or structure 8. Tightening the nut draws the wedge into the expansion clip, thereby expanding the expansion clip against an interior surface 7a of the hole 7 and thus securing the anchor 1 to the structure.

Such wedge anchors can be used as safety anchors by adding a hanger between the washer 5 and an external surface 8b of the structure 8 on which the washer is seated, such as that shown in FIG. 2 of U.S. Pat. No. 8,894,329 and referenced as element 12. This Figure of the '329 patent is reproduced herein as FIG. 2.

The hanger 12 has a through aperture (not visible in FIG. 2) for receiving a bolt 14, and another, larger through aperture 12b for receiving attachment hardware such as a climbing caribiner or the like. Both apertures are contiguously surrounded by metal, thus preventing any possibility of the bolt or attachment hardware escaping from the respective apertures.

It is a well known drawback of low cost wedge anchors like the wedge anchor 1 shown in FIG. 1 that they are impractical to remove after having been installed. Once the expansion clip is expanded, there is no practical way to relieve the pressure produced by the wedge as would be needed to cause the expansion clip to loosen its grip on the interior surface of the hole.

The low cost wedge anchor 10 of the '329 patent shown in FIG. 2 was provided to solve this problem. It provides an adaptation to the element shown as 18, referred to in the patent as the "cage," that permits backing the element 18, i.e., the wedge, out of the cage by turning the bolt 14, thereby relieving the force between the cage and the hole and thus allowing for pulling the cage and bolt out of the hole.

Notwithstanding the removability improvement provided by the anchor 10 of FIG. 2 as compared to the anchor 1 of FIG. 1, there is a remaining problem that safety anchors are installed in outdoor environments and are used over extended periods of time during which they are subject to weathering and corrosion, and the capability to remove the anchor 10 in the manner intended will be degraded as the internal parts corrode.

Wear-out due to corrosion is a particularly important safety concern in safety anchors installed in rock faces near seas or oceans, but in any case wear is to be expected and it is therefore important to be able to remove and replace safety anchors either when wear is observed to have reached a level of concern or on a preventive maintenance schedule. Moreover, it is always important to preserve the natural beauty of climbing environments, so it is important to be able to effectuate such repairs without the need to drill new holes that would further mar, scar, or weaken the rock.

It is therefore an object of the present invention to provide for a lower cost than the aforedescribed safety anchor 10, and to still further improve on the ease with which the anchor can be removed from the existing hole in which it has been installed without damaging the hole, even after the anchor has experienced corrosion.

SUMMARY

Disclosed is a safety anchor for anchoring to a structure having a drilled hole therein, the anchor comprising a hanger member, an elongate threaded member, and an elongate hollow sleeve member. The hanger member defines a substantially flat surface for seating on a correspondingly substantially flat surface of the structure and has a first aperture for connecting a climbing safety tether. The threaded member and sleeve member have corresponding head and tail ends. The sleeve member is adapted for coaxial disposition about the threaded member, the head end of the threaded member is adapted for receiving a nut, and the tail end of the threaded member has a wedge portion adapted to expand the tail end of the sleeve member as a consequence of tightening the nut. The sleeve member has a body portion of relatively small dimensions suitable for allowing the body portion of the sleeve member to fit into the drilled hole, and the head end of the sleeve member has a lip portion of relatively large dimensions suitable for preventing the lip portion of the sleeve member from fitting into the drilled hole. The substantially flat surface of the hanger member contiguously surrounds a recess in the hanger member which is adapted to provide a volume of relief above the surface of the structure sufficient to receive the lip portion of the sleeve member therein. A second aperture extends through the recess for passing at least a portion of the head end of the threaded member therethrough.

The second aperture may in all respects be smaller than the first aperture.

Also disclosed is a method for removing a safety anchor from a hole drilled into a structure, wherein the safety anchor comprises an elongate threaded member, a sleeve, and a hanger, and wherein there is a nut threaded onto an exposed head end of the elongate threaded member. The method comprises removing the nut, and after removing the nut, removing the hanger, and after removing both the nut and the hanger, removing the sleeve from the hole.

After the step of removing both the nut and the hanger but before the step of removing the sleeve from the hole, the method may comprise applying an impact force to the threaded member so as to at least partially expel the wedge from the sleeve.

The sleeve may have a lip portion which, before the step of removing the hanger, was captured between a surface of the structure surrounding the hole and a recess in the hanger. In such case, the step of removing the sleeve may comprise applying a force to the lip portion.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 1:
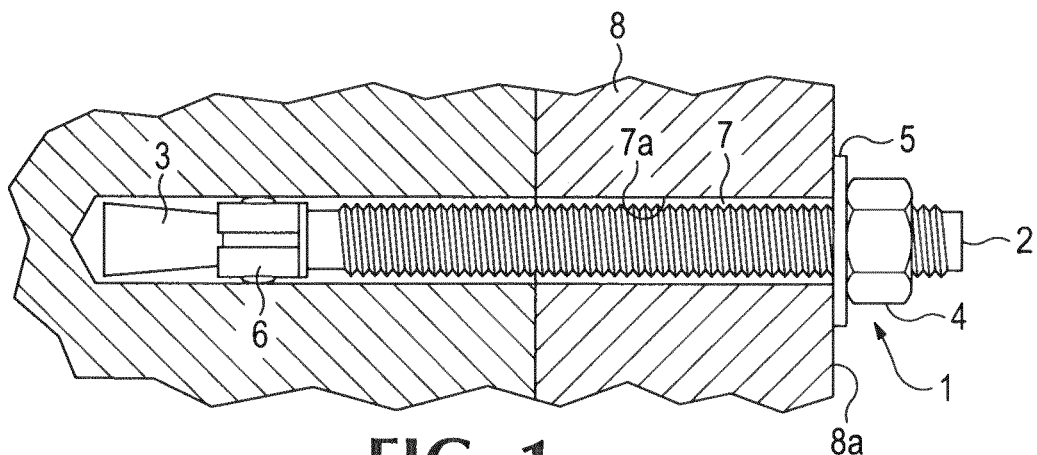
FIG. 1 is a side sectional view of a first prior art low cost concrete wedge anchor.
Figure 2:
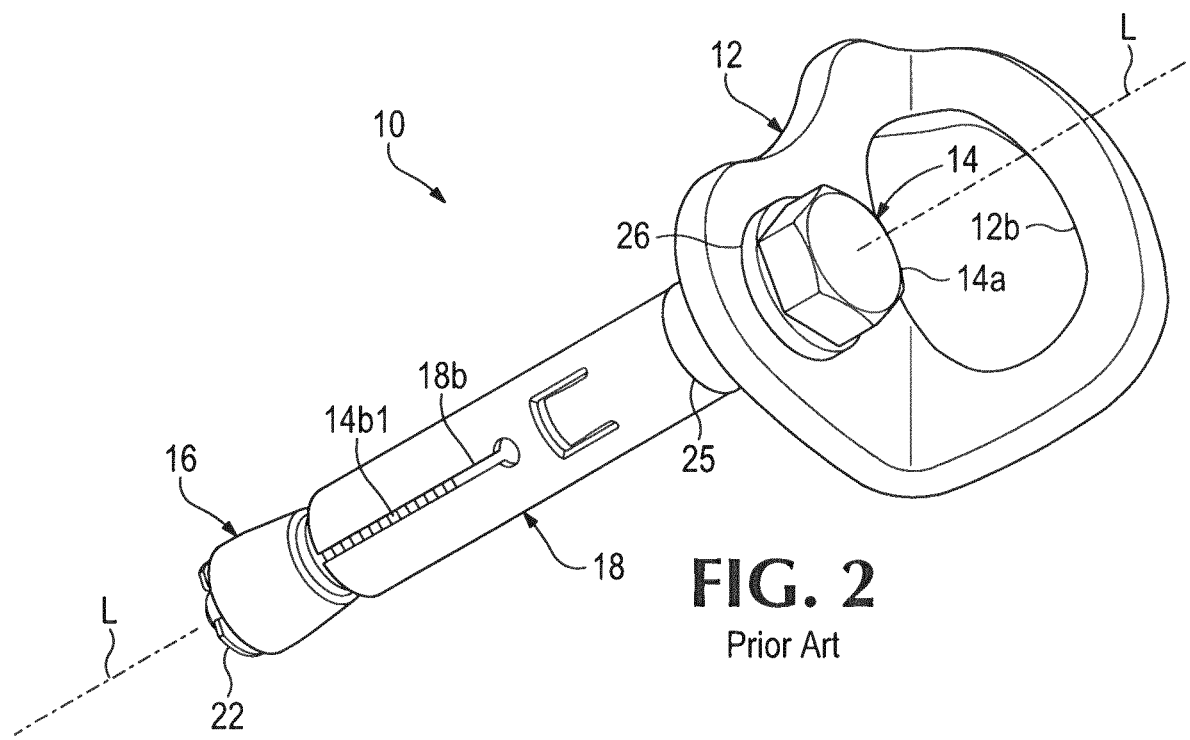
FIG. 2 is an isometric view of a second prior art low cost concrete wedge anchor particularly adapted to provide for fall protection.
Figure 3:
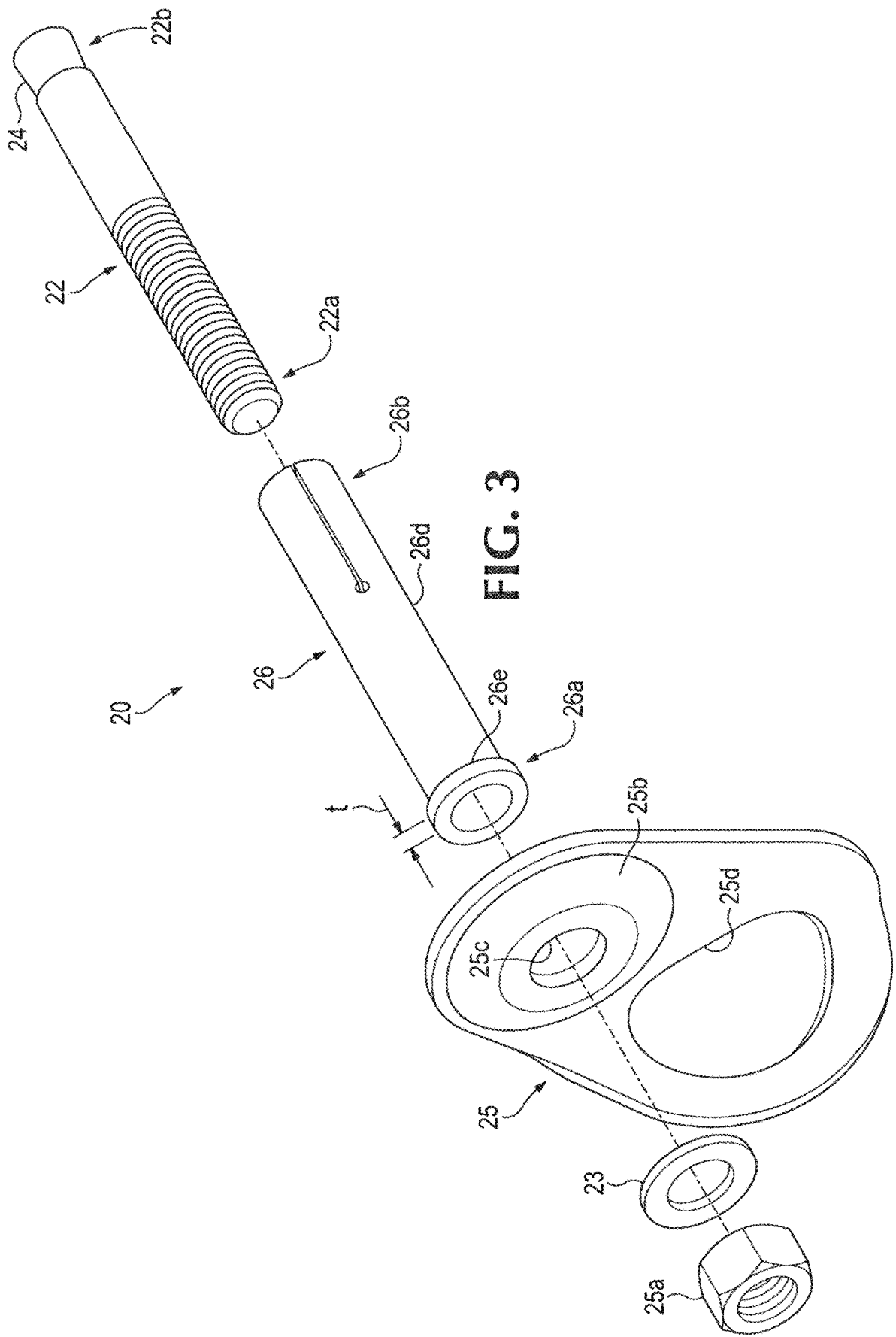
FIG. 3 is an exploded isometric view of a safety anchor according to the present invention.

FIG. 3 shows a safety anchor 20 according to the present invention. The anchor 20 may employ the same threaded stud 2 and wedge 3 as the aforementioned prior art wedge anchor 1 (FIG. 1), these two elements being referenced in FIG. 3 as 22 and 24 respectively, with the expansion clip 6 of the anchor 1 being replaced with a sleeve 26, and the nut 4 being replaced with a combination hanger 25 and nut 25a, and wherein the hanger 25 represents a modification to the element 12 of the prior art anchor 10 shown in FIG. 2.

For reference below, the stud 22 has a head end 22a and a tail end 22b; and the sleeve 26 has corresponding head and tail ends 26a and 26b.

Figure 4:
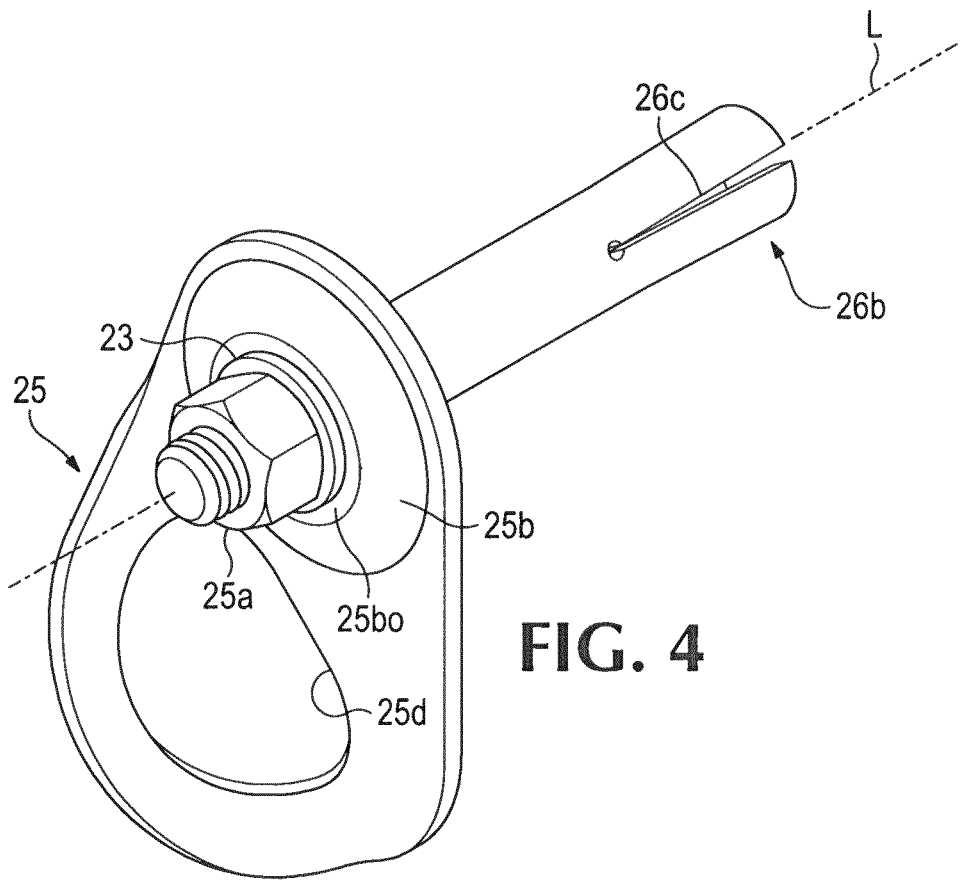
FIG. 4 is an isometric view of the safety anchor of FIG. 5 as it would appear when installed in a drilled hole.

FIG. 4 shows the safety anchor 20 as it would be installed in a drilled hole ("installed configuration"), such as but not limited to a hole that has been drilled into a rock formation for the purpose of providing a safety anchor-point for a rock climber. The sleeve 26 is generally cylindrical, and is coaxially disposed about the threaded stud 22 so as to define an elongate axis "L" for the anchor. For reference, longitudinal dimensions or directions are defined to be parallel to the axis "L" and radial dimensions or directions are defined to be perpendicular to the axis "L."

In the installed configuration of the anchor 20 shown in FIG. 4, the wedge 24 of the stud 22 is not visible because it has been withdrawn into the sleeve 26 at the tail end 26b thereof, with the result being to radially expand the sleeve 26. This is a well known feature of wedge anchors, including the prior art wedge anchor 10 noted above. This expansion may be facilitated by the provision of one or more slots 26c in the sleeve that define lines of weakness in the sleeve in the vicinity of the wedge 24, and the small terminating hole shown in the Figure as well.

Figure 5:
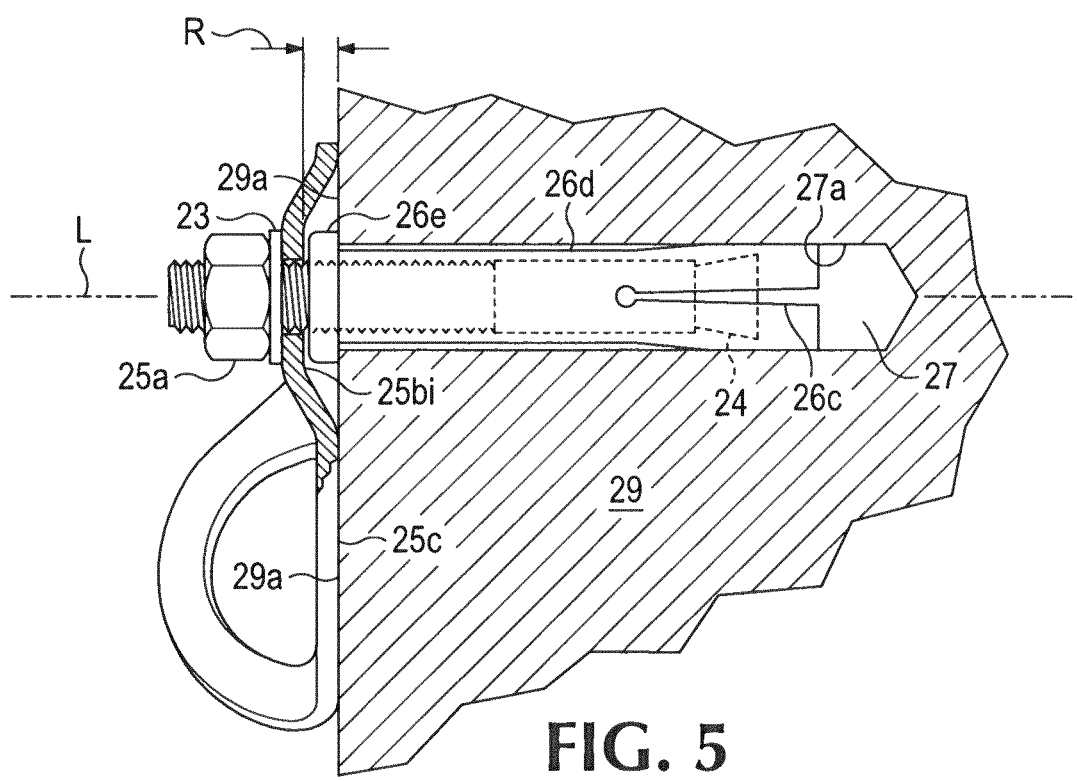
FIG. 5 is a side sectional view of the safety anchor of FIG. 4 installed in a drilled hole.

FIG. 5 shows the anchor as shown in FIG. 5 installed in a hole 27 which has been drilled into a natural structure 29 such as a rock formation. A cylindrical body portion 26d of the sleeve 26 is smaller radially than the surface 27a of the hole 27 so that the body portion of the sleeve can be inserted easily into the hole, but in the vicinity of the wedge 24 the sleeve can be expanded to become larger radially than the surface of the hole, as a consequence of tightening the nut 25a, to secure the anchor in the hole.

Returning to FIG. 3, the head end 26a of the sleeve 26 terminates in a lip portion 26e that is larger radially than the body portion 26d. The hole 27 shown in FIG. 5 is large enough to accept the body portion of the sleeve, but not large enough to accept the lip portion, so the lip portion is prevented from entering the hole.

Also referring to FIG. 3, the hanger 25 has a relieved portion 25b which defines a recess or volume of relief in the hanger, which is shaped like a dome or cup in this embodiment but which may have other shapes, through which there is a relief hole 25c for receiving the head end 22a of the threaded stud 22. The relief hole 25c is large enough to accept the head end of the stud, but not large enough to accept the lip portion 26e of the sleeve, so that, returning to FIG. 5, the lip portion of the sleeve is captured between an outer surface 29a of the structure 29 on which the hanger 25 is seated and an inner surface 25bi of the relieved portion 25b, within the relief volume. This result defines a minimum relief depth "R" that should be provided inside the relieved portion of the hanger, e.g., the thickness "t" of the lip portion 26b (see FIG. 3) plus a minimum (non-zero) tolerance, e.g., 1/16 inch. Both the thickness of the lip portion "t" and the width of the lip portion (e.g. the diameter of the lip portion, if cylindrical as shown, measured perpendicular to the thickness) may be any that is desired, but preferably these dimensions may range between 0.030-0.500 inches; and more preferably they may range between 0.150-0.200 inches, in any combination.

As best seen in FIG. 4, the relieved portion 25b of the hanger 25 may have an annular outer surface 25bo surrounding the relief hole 26f for seating thereon a washer 23 between the nut 25a and hanger.

The hanger 25 also has an under-surface 25c that is typically flat, either surrounding or partially surrounding the relieved portion 25b, adapted to ensure seating the hanger on the outer surface 29a of the structure 29, which is also typically substantially flat, when the nut 25 is tightened.

Figure 6:
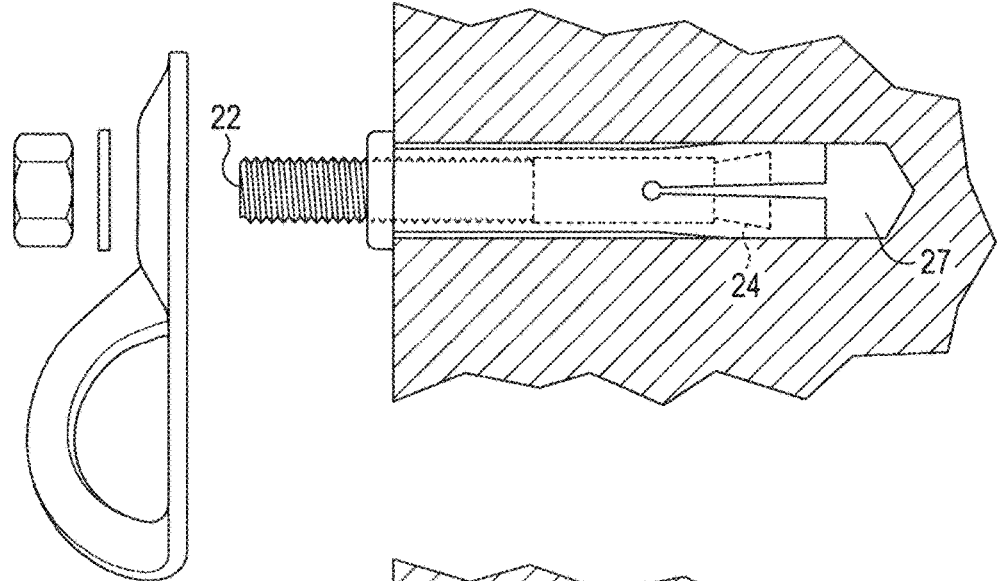
FIG. 6 is a side sectional view of the safety anchor of FIG. 5 in the process of being removed from the hole.
Figure 7:
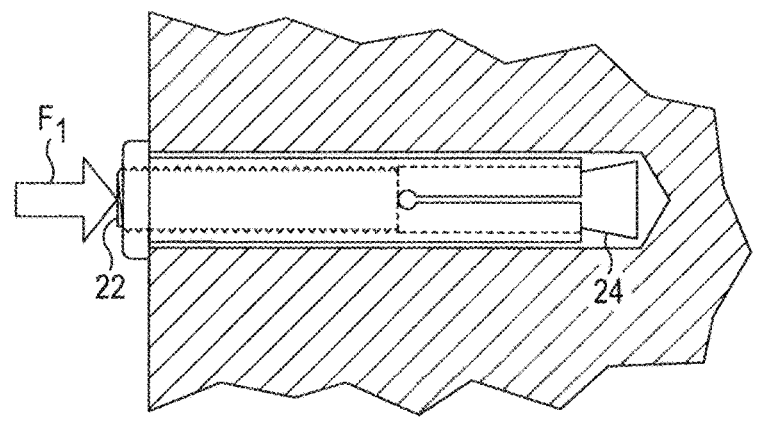
FIG. 7 is a side sectional view of the safety anchor of FIG. 6 further in the process of being removed from the hole.
Figure 8:
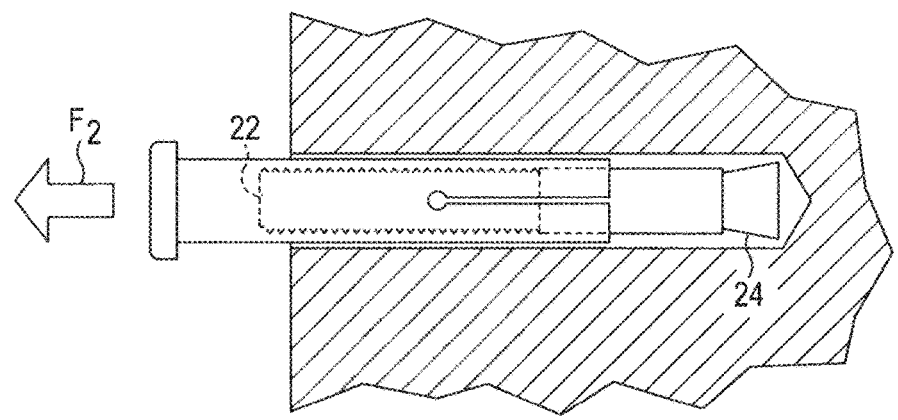
FIG. 8 is a side sectional view of the safety anchor of FIG. 7 further in the process of being removed from the hole.

FIGS. 6-8 show how to remove the anchor 20 as shown in FIG. 5 from the hole 27.

First, as shown in FIG. 6, the nut 25a, washer 23, and hanger 25 may be removed.

Next, as shown in FIG. 7, an impact force "$F_1$" may be applied to the head end of the stud 22, to drive the stud further into the hole and either partially or completely expel the wedge 24 from the tail end 26d of the sleeve 26, thus relaxing the frictional force exerted by the sleeve on the interior surface of the hole sufficiently to allow the sleeve to be pulled out of the hole.

Next, as shown in FIG. 8, the sleeve may be pulled out of the hole by applying a pulling force "$F_2$" to the lip portion 26e. The sleeve can be grasped for performing this pulling action with a pair of pliers, and removal of the sleeve may be further facilitated by driving a wedging tool, such as the blade of a flat blade screwdriver, between the lip portion and the external surface 29a of the structure, and prying. It may be noted that allowing for more than the minimum relief "R" in the hanger as described above allows the lip portion 26e of the sleeve to stand away from the surface 29a when the nut 25a is tightened, leaving some of the body portion 26d of the sleeve 26 exposed and accessible before commencing this pulling action.

Finally, after the sleeve 26 has been fully removed from the hole, the stud 22 can be pulled out of the hole, thus completing the extraction of the anchor. It is an outstanding advantage of the safety anchor 20 that all these actions can typically be performed even if the parts of the anchor have corroded.

Thus the anchor 20 provides two outstanding features that work together—the relieved portion of the hanger enables provision of the lip portion of the sleeve, and the lip portion of the sleeve enables grasping the sleeve so that it can be pulled out of the hole along with the remainder of the anchor.

Figure 9:
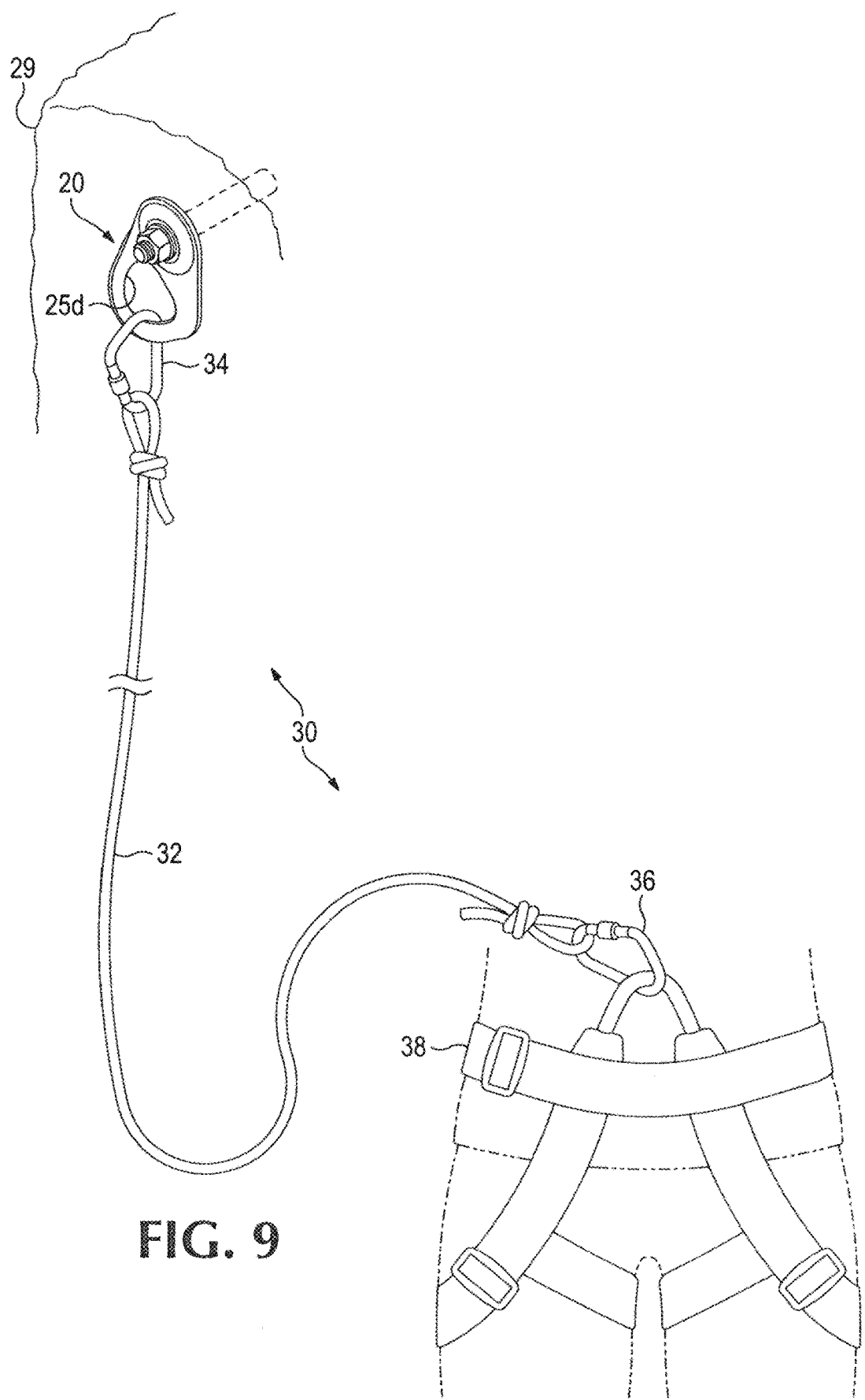
FIG. 9 is a pictorial view of a rock climber tethered to a rock formation by use of the safety anchor of FIGS. 3-5.

A typical but not limiting use of the anchor 20 is shown in FIG. 9, wherein a climber 30 is shown coupled to the structure 29. The hanger 25 has a connecting aperture 25d that is typically larger in all respects than the aforedescribed relief hole 25c (see FIG. 3). The connecting aperture 25d is used for connecting a "climbing safety tether" 30, which may be one of what are known in the art as the quick-draw, perma-draw, or alpine sling, which are all common examples of climbing safety tethers used in the rock climbing art. FIG. 9 shows a simple climbing safety tether having two carabiners tied together with a rope 32, one carabiner 34 for hooking to the connecting aperture 25d and the other carabiner 36 for hooking to a climbing harness 38 worn by the climber.

While intended specifically as a safety anchor for rock climbing, the safety anchor 20 could be used in a hole drilled into any structure, natural or human-made, including a part of a concrete building.

It is to be understood that, while a safety anchor according to the present invention has been shown and described as preferred, other configurations could be utilized, in addition to those already mentioned, without departing from the principles of the invention. For example, the relieved portion 25b of the hanger 25 is preferably contiguously surrounded by the material defining the under-surface 25c to ensure that the hanger cannot be inadvertently knocked, away from the stud 22, out from under the nut 25a. But while it would not be preferable, especially for use as a safety anchor, the hanger including the relieved portion could be slotted to allow for knocking the hanger out from under the bolt head sideways for removal, to gain access to the lip. Also for example, the headless threaded stud 22 could be replaced with a headed bolt, and instead of turning a nut threaded onto the stud to draw the stud toward the hanger and thereby draw the wedge into the sleeve, the same effect could be obtained by turning the head of the bolt. But removing the wedge anchor 20 from the hole in which it has been installed requires: removing the nut from the elongate threaded member to allow for removing the hanger and gaining access to the lip. This would be the equivalent of excising the head of the bolt, a not impossible but non-trivial task.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A safety anchor for anchoring to a structure having a hole drilled therein, the safety anchor comprising:
   a hanger member defining a substantially flat surface for seating on a correspondingly substantially flat surface of the structure and having a first aperture for connecting a climbing tether to the safety anchor;
   an elongate threaded member having a head end and a tail end; and
   an elongate hollow sleeve member having a head end and a tail end corresponding respectively to the head and tail ends of the threaded member, the sleeve member adapted for coaxial disposition about the threaded member, the head end of the threaded member adapted for receiving a nut, and the tail end of the threaded member having a wedge portion adapted to expand the tail end of the sleeve member as a consequence of tightening the nut, the sleeve member having a body portion of relatively small dimensions suitable for allowing the body portion of the sleeve member to fit into the hole, and the head end of the sleeve member having a lip portion of relatively large dimensions suitable for preventing the lip portion of the sleeve member from fitting into the hole, wherein the substantially flat surface of the hanger member at least partially surrounds a recess in the hanger member, the recess adapted to provide a volume of relief above the surface of the structure, wherein a second aperture extends through the recess, at least a portion of the head end of the threaded member passes through the second aperture to receive the nut outside the recess and secure the hanger to the elongate threaded member, and the lip portion of the sleeve member is disposed inside the recess, between the second aperture and the structure.

2. The safety anchor of claim 1, wherein the second aperture is smaller than the first aperture.

3. A method for removing a safety anchor from a hole drilled into a structure, wherein the safety anchor comprises an elongate threaded member having a head end and a tail end, an elongate hollow sleeve member having a head end and a tail end corresponding respectively to the head and tail ends of the threaded member, the sleeve member coaxially disposed about the threaded member, a nut threaded onto the head end of the threaded member, the tail end of the threaded member including a wedge portion for expanding the tail end of the sleeve member as a consequence of tightening the nut, and a hanger defining a substantially flat surface for seating on a correspondingly substantially flat surface of the structure and having a first aperture for connecting a climbing tether to the safety anchor, the substantially flat surface of the hanger member at least partially surrounds a recess in the hanger member, the recess providing a volume of relief above the surface of the structure, a second aperture extends through the recess, at least a portion of the head end of the threaded member passes through the second aperture to receive the nut outside the recess and secure the hanger to the elongate threaded member, and the lip portion of the sleeve is disposed inside the recess, between the second aperture and the structure, the method comprising:
   removing the nut;
   after removing the nut, removing the hanger; and
   after removing both the nut and the hanger, removing the sleeve member from the hole.

4. The method of claim 3, further comprising, after said step of removing both the nut and the hanger but before said step of removing the sleeve from the hole, applying an impact force to the threaded member so as to at least partially expel the wedge from the sleeve.

5. The method of claim 4, wherein the sleeve has a lip portion which, before said step of removing the hanger, was captured between a surface of the structure surrounding the hole and a recess in the hanger, and wherein said step of removing the sleeve comprises applying a force to the lip portion.

6. The method of claim 3, wherein the sleeve has a lip portion which, before said step of removing the hanger, was captured between a surface of the structure surrounding the hole and a recess in the hanger, and wherein said step of removing the sleeve comprises applying a force to the lip portion.

* * * * *